(12) United States Patent
Kivits et al.

(10) Patent No.: US 8,300,506 B1
(45) Date of Patent: Oct. 30, 2012

(54) OVERWRITE PARAMETER DETERMINATION FOR OPTICAL DRIVE

(75) Inventors: Peter J. Kivits, Waalre (NL); Ben Idris P. Pascual, Marikina (PH); Julie Faminial, Jr., Mandaluyong (PH)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/167,344

(22) Filed: Jun. 23, 2011

Related U.S. Application Data

(60) Provisional application No. 61/357,852, filed on Jun. 23, 2010.

(51) Int. Cl.
*G11B 7/00* (2006.01)

(52) U.S. Cl. ...................................... 369/47.53; 369/116

(58) Field of Classification Search .................. 369/116, 369/120, 122, 47.5, 47.51, 47.53, 47.54, 369/47.55
See application file for complete search history.

(56) References Cited

U.S. PATENT DOCUMENTS 7,035,184 B2 * 4/2006 Takeda ..................... 369/47.39
8,116,180 B2 * 2/2012 Hayashi ..................... 369/47.5

* cited by examiner

*Primary Examiner* — Nabil Hindi

(57) ABSTRACT

Embodiments of the present disclosure provide a method, comprising iteratively writing a plurality of test portions to a storage medium sing a corresponding plurality of test parameter sets; iteratively erasing the plurality of test portions from the storage medium using corresponding erase power levels included within the corresponding plurality of test parameter sets and determining an overwrite parameter set for writing user data to the storage medium, the determining based on write performance characteristics of the plurality of test portions after the plurality of test portions have been iteratively erased and rewritten for a predetermined number of iterations.

21 Claims, 5 Drawing Sheets

OVERWRITE PARAMETER DETERMINATION FOR OPTICAL DRIVE

CROSS REFERENCE TO RELATED APPLICATIONS

This disclosure claims priority to U.S. Provisional Patent Application No. 61/357,852, filed Jun. 23, 2010, the entire specification of which is hereby incorporated by reference in its entirety for all purposes, except for those sections, if any, that are inconsistent with this specification.

This disclosure is related to U.S. patent application Ser. No. 12/022,046, filed Jan. 29, 2008 by Peter J. Kivits, Julie O. Faminial Jr., and Jake F. Ballares, and entitled "IMPROVED WRITE STRATEGY CALIBRATION FOR OPTICAL DRIVES," and which claims priority to U.S. Provisional Patent Application No. 60/887,255, filed Jan. 30, 2007.

TECHNICAL FIELD

Embodiments of the present disclosure relate to optical drives, and in particular optical drives that calibrate write and erase parameters for overwriting optical discs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor implicitly admitted as prior art against the present disclosure.

A rewriteable disc is manufactured to have a glossy rewriteable layer. To write to a rewriteable disc, a laser beam with relatively high power is used to quickly melt portions of the disc's rewriteable layer, thereby causing those portions to lose their glossy state and become amorphous. The differences in reflectivity between glossy and amorphous portions of the disc are detected when reading from the optical disc. To erase a rewriteable disc, a laser beam with a relatively low power used to slowly melt the rewriteable layer, which causes the rewriteable layer to assume its crystallized or glossy state upon cooling.

Optical drive writing performance often varies due to factors such as manufacturing differences between various optical drives, differences between various recordable media (such as type of disc, brand of disc), and differences in disc speeds. Environmental conditions such as temperature can also have an impact on optical drive writing performance. Optical media manufacturers often include "address in pregoove" (ADIP) information that provides write strategy parameters (such as write power and pulse shape) to the optical drive. But drive developers often determine that an alternative write strategy works better for their particular drives, and they therefore program alternative write parameters into the drive firmware to override the ADIP information.

SUMMARY

In one embodiment, the present disclosure provides a method comprising iteratively writing a plurality of test portions to a storage medium using a corresponding plurality of test parameter sets; iteratively erasing the plurality of test portions from the storage medium using corresponding erase power levels included within the corresponding plurality of test parameter sets; and determining an overwrite parameter set for writing user data to the storage medium, the determining based on write performance characteristics of the plurality of test portions after the plurality of test portions have been iteratively erased and rewritten for a predetermined number of iterations.

In various embodiments, there is also provided an apparatus, comprising one or more processors configured to implement logic modules, the logic modules including a test portion overwrite module configured to iteratively write and erase test data to a plurality of portions of a storage medium based on a plurality of corresponding test parameter sets, wherein the plurality of corresponding test parameter sets include corresponding write power levels and corresponding erase power levels; and an overwrite parameter set selection module configured to determine, based on overwrite performance characteristics of the plurality of portions, an overwrite parameter set including a write power and an erase power for use in writing and erasing user data to the storage medium, wherein the overwrite parameter set is determined after the plurality of portions have been overwritten a certain number of times.

In various embodiments, there is also provided an optical drive, comprising a laser; and firmware configured to cause the laser to alternatingly write and erase test data to a plurality of test portions of an optical disc a predetermined number of times utilizing a plurality of corresponding test parameter sets, and determine an overwrite parameter set for use in writing and erasing user data to the optical disc based on overwrite performance characteristics of the plurality of test portions.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Overview

Figure 1:
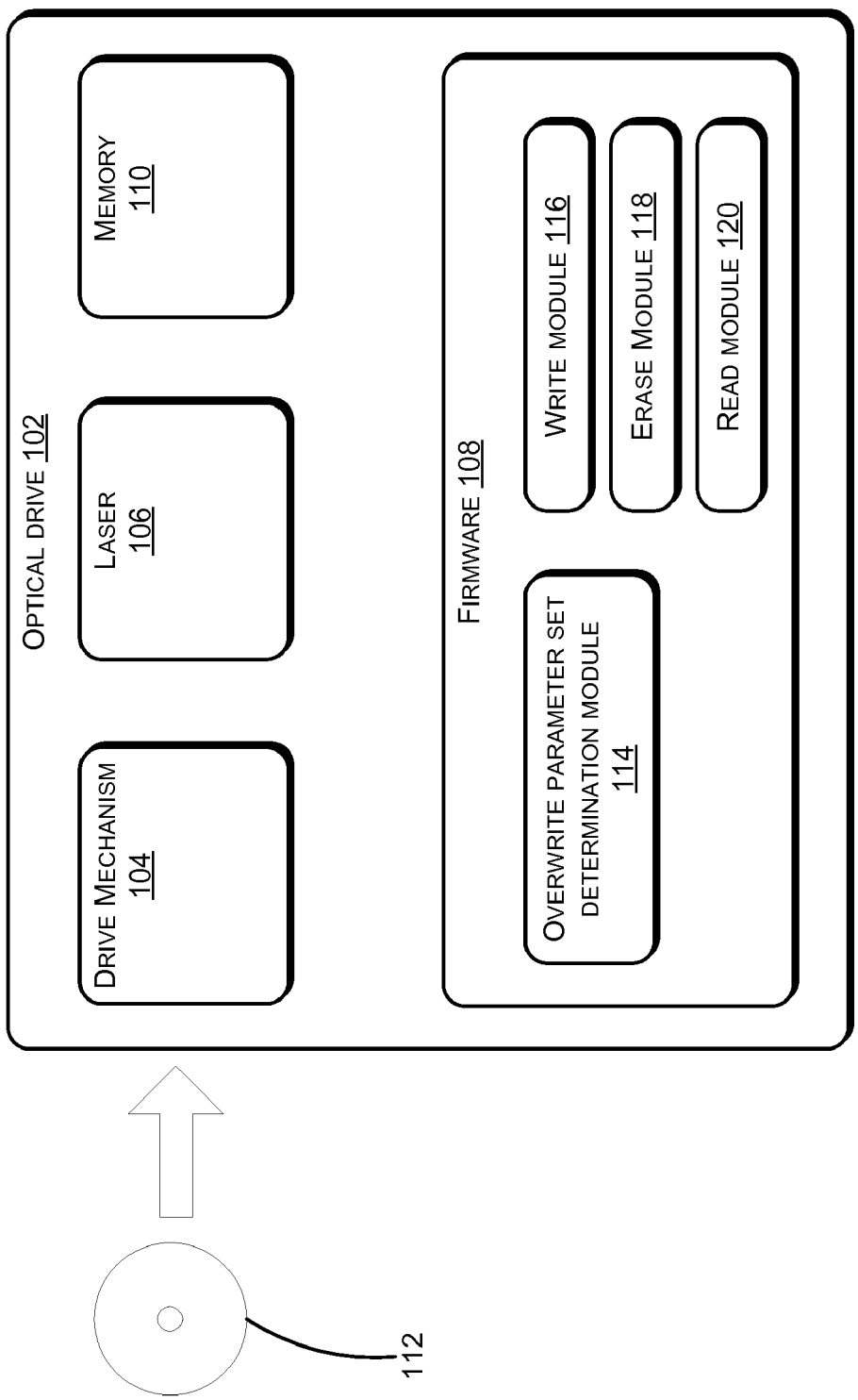
FIG. 1 is a schematic diagram of an example of an optical drive configured to determine overwrite parameters for use with rewriteable discs.

Different write strategies may work best with different optical discs and/or with different optical drives. Drive developers therefore program their optical drives' firmware with different write strategies for different brands and types of discs. Embodiments of the present disclosure include methods for calibrating write and erase strategies for rewriteable optical discs that can be performed by the optical drive prior to writing to a rewriteable disc. Calibrating the write and erase strategies does not require the pre-programming of write and erase strategies into firmware during a development or manufacturing stage of the optical drive.

Embodiments of the present disclosure iteratively write, erase, and overwrite a small number of test tracks using various test parameter sets. After a certain number of iterations (typically two or three iterations), the rewrite performance of the test tracks are evaluated. The performance results for the different test tracks are compared to a threshold to ensure a minimum level of performance. And based on the performance results, an overwrite parameter set is selected for use in writing, erasing, and overwriting user data for the disc. A test parameter set associated with the best-performing test track is selected to be the overwrite parameter set. Alternatively, the overwrite parameter set is calculated based on the test parameter sets and the performance results of the test tracks.

The test parameter sets include various parameters such as write power, laser tilt, erase power, and so on. The test tracks are written, erased, and overwritten using different test parameter sets for each test track. Overwriting (erasing and re-writing) the disc during the testing phase, as well as varying erase power in the various test parameter sets, allows the particular characteristics of a rewriteable disc to be better taken into account when calibrating the rewrite strategy for the disc.

Embodiments typically go through two or three iterations of erasing and rewriting before determining the rewriting performance characteristics of the test tracks. This is because a "fresh" (unused) rewriteable disc is often physically different from an erased disc. A rewriteable disc is usually written using a more powerful laser than lasers used by optical gives to erase a disc. As a result, the optimum write power for a disc that has been rewritten one or more times is likely to be different (and likely lower) than the optimum writ for a fresh disc, and will continue to vary slightly with additional erase iterations.

After two or three iterations, changes in optimum write and erase powers will not vary much with additional iterations. Embodiments of the present disclosure will therefore typically use two or three overwrite iterations (three or four writes, and two or three erases) prior to determining the rewrite performance characteristics of the test tracks. But embodiments also include calibration methods that utilize four, five, or more iterations during the test phase.

Erasing and/or writing a rewriteable disc using power levels that are too high can irreparably harm the rewriteable surface of the rewriteable disc and impact the number of times that a rewriteable disc is able to be written. Therefore, the test parameter sets include erase and write power parameters that are constrained to be within acceptable ranges for rewriteable discs.

In various embodiments, the rewriting performance includes one or more of jitter, block error rate, or other performance measures. In various embodiments, one or more performance measures are used to form a composite score to determine the selected overwrite parameter set to be used for writing user data to the disc.

The present disclosure uses the terms "track" to refer to portions of an optical disc that are used to store test and/or user data on the optical disc. Embodiments of the present disclosure write, erase, and overwrite various portions of optical discs on portions that may or may not be discrete "tracks." The use of the word "track" is therefore not meant to be limiting, and is used throughout merely for the sake of clarity and discussion.

ILLUSTRATIVE EMBODIMENTS

FIG. 1 is a schematic diagram of an example of an optical drive 102 configured to determine overwrite parameters for use with rewriteable discs. Optical drive 102 includes drive mechanism 104, laser 106, firmware 108, and memory 110. As described elsewhere within this Detailed Description, firmware 108 may be implemented as a hardware logic device, as a plurality of stored programming instructions executable by one or more processors, and/or by some combination of hardware and software.

Drive mechanism 104 includes a slot for insertion of optical disc 112. Optical disc 112 may be a Compact Disc-Re-Writeable (CD-RW) or other rewriteable disc type, such as a rewriteable digital versatile disc (DVD-RW, DVD+RW), Blu-ray Disc Rewritable (BD-RE), and so forth. Drive mechanism is coupled to laser 106, and laser 106 is operable to read data from optical disc 112, to erase data from optical disc 112, and to overwrite data on optical disc 112. Drive mechanism 104 includes various components such as a rotational mechanism to rotate optical disc 112.

Firmware 108 includes an overwrite parameter set determination module 114 configured to determine a set of one or more parameters for use to write and erase data on optical disc 112. To accomplish this, overwrite parameter set determination module 114 selects or generates a plurality of test parameter sets for writing test tracks onto optical disc 112. The parameter sets include various parameters such as laser power (erase and write power levels as well as others), laser focus depth, tilt of objective lens, radial offset, width distribution, interval between pulses, peakedness, amplitude, phase, frequency, inter-pulse separation, switch speed, length or width of pits and lands, user-defined parameters, and others, in an embodiment, the parameter sets also include desired levels of the various parameters as well.

Overwrite parameter set determination module 114 is configured to cause write module 116 and erase module 118 to iteratively write and erase test data to test tracks or other portions of optical disc 112, such as by operation of laser 106 and operation of a rotational mechanism within drive mechanism 104. The test tracks or test portions may be written in a test area of optical disc 112, such as in error correction code (FCC) frames, or other blank locations that are not reserved for user data.

Overwrite parameter set determination module 114 is configured to determine, after a certain number of iterations of writes and erases of the test data, overwrite performance characteristics of the test tracks or portions. For example, overwrite parameter set determination module 114 is configured to cause read module 120 to read the test data from the test tracks or portions and determine performance characteristics of the resulting signals. Example performance characteristics include an asymmetry measure of the high frequency (HF) signals read from the test tracks or portions (i.e., the relationship between the smallest and largest symbols in the signal), a parameter called "Beta" that represents the relationship between the alternating current (AC) and direct current (DC) level of the HF signal, a block error rate (BLER) of the signals read from the test tracks, signal jitter, and various combinations of run lengths of pulses of an Eight-to-Fourteen Modulation (EFM) signal, among others.

Overwrite parameter set determination module 114 is also, in embodiments, configured to determine a composite score, such as a penalty function value or other, based on two or more performance characteristics. If the performance characteristics, or a composite score based on two or more) performance characteristics, of at least one test track or portion is within an acceptable range, overwrite parameter set determination module 114 will determine an overwrite parameter set for use for writing user data using the one or more test tracks or portions with acceptable performance characteristics. If no test track or portion meets acceptable performance characteristics, then overwrite performance determination module 114 will cause additional test tracks to be iteratively erased and overwritten using new overwrite parameters, and then repeat the evaluation process. Overwrite parameter set determination module 114 also writes, upon selection of an overwrite parameter set to use for writing user data, an additional test track (i.e., a confirmation track) and verifies that its quality is acceptable.

In addition to writing, erasing, and reading test data using test parameter sets, write module 116, erase module 118, and read module 120 are also configured to write, erase, and read user data using the overwrite parameter set determined or selected by overwrite parameter set determination module 114.

Examples of Processes

Figure 2:
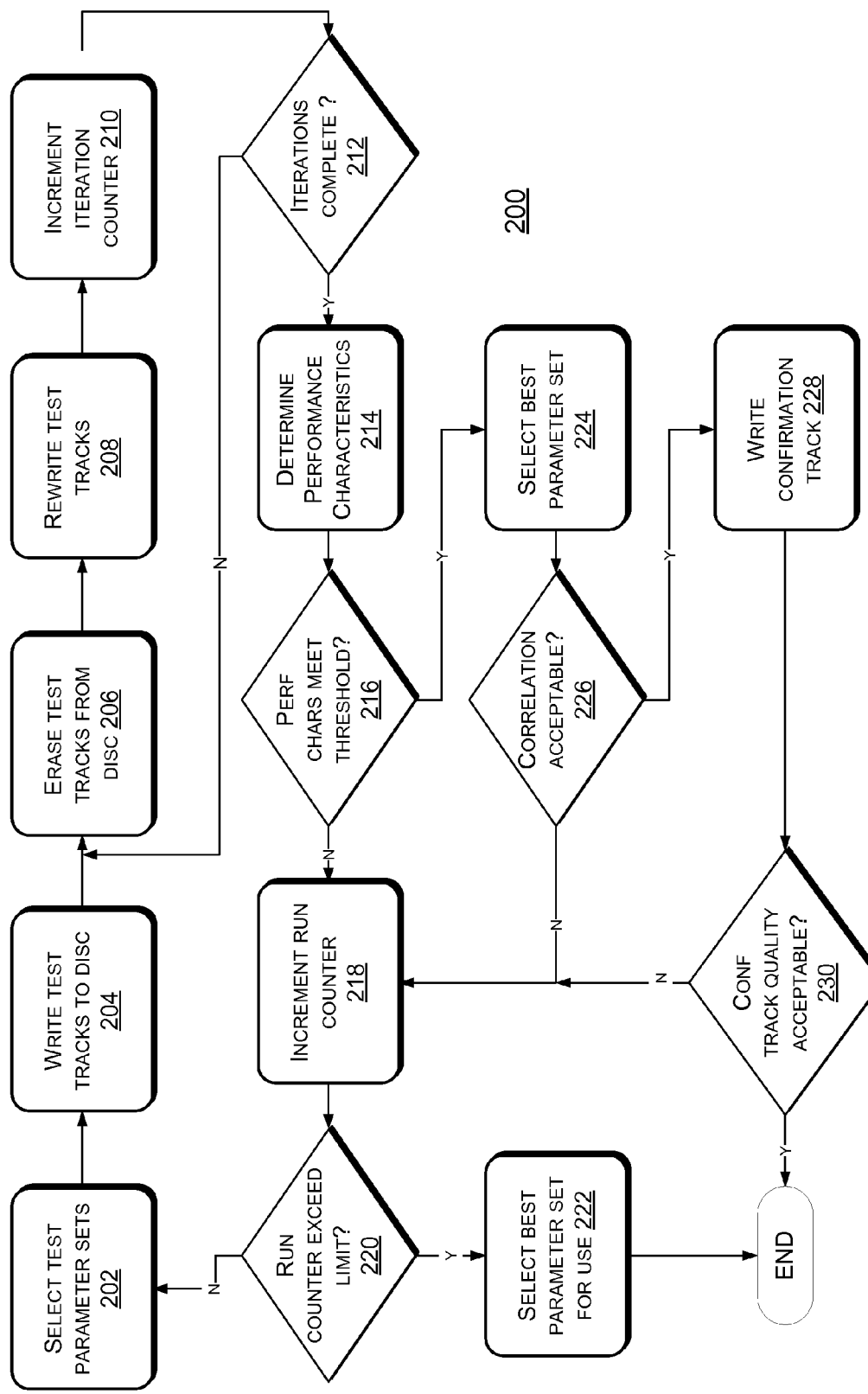
FIG. 2 is a flowchart showing an example of a process for selecting overwrite parameters from a plurality of test parameter sets based on overwrite performance characteristics.

FIG. 2 is a flowchart illustrating an example of a process 200 for selecting overwrite parameters from a plurality of test parameter sets based on overwrite performance characteristics. The methods of FIG. 2 may be implemented by computer-executable instructions. Generally, computer-executable instructions can include routines, programs, objects, components, data structures, procedures, modules, functions, and the like that perform particular functions or that implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods according to various embodiments of the present disclosure. Additionally, individual blocks may be omitted from the method without departing from the spirit scope of the subject matter described herein. In the context of software, the blocks represent one or more computer instructions that, when executed by one or more processors, perform the recited operations.

Referring back to FIG. 2, process 200 includes, at 202, selecting a plurality of test parameter sets. The test parameter sets are selected to have combinations of allowable values for use in rewriteable discs. For example, the ADIP information included on the disc may include acceptable ranges for various parameters. If so, the optical drive uses the ADIP information to construct the test parameter sets. Alternatively, the optical drive uses preprogrammed ranges of allowable values to construct the plurality of test parameter sets. In still further embodiments, the test parameter sets are themselves preprogrammed onto the optical drive firmware or downloaded for use by the optical drive. The test parameter sets include, among others, various erase power levels. By testing with parameter sets that include various erase power levels, the response of the particular optical disc to overwriting can be determined when selecting parameter sets for use in writing and erasing user data to and from the disc.

The parameters of the test parameter sets are randomly varied using well-known Design-of-Experiment (DOE) principals. For example, the parameters can be varied according to a Taguchi method or a Box-Benhken method, among others. The parameters are varied so as to reduce or avoid unacceptable correlations between the output performance characteristics and conditions that are not based on the test parameters. For example, in some optical drives, stepping laser power levels up in a linear fashion leads to unacceptable correlations between performance characteristics and, for example, laser temperature or time. If there is an unacceptable correlation between performance characteristics and factors other than the test parameters, then it is difficult to know whether a perceived correlation between test parameters and performance characteristics is meaningful. Randomly varying power levels and other parameters of the test parameter sets improves the reliability of the test results.

At 204, test tracks or portions are written to the disc using corresponding ones of the test parameter sets. The test tracks are written according to various parameters of the test parameter sets, such as write power levels, laser tilt angles, and so forth. At 206, the test tracks or portions are erased from the disc using the corresponding test parameter sets. The test tracks are erased according to various parameters of the test parameter sets, such as erase power levels. At 208, the user data is rewritten to the test tracks or portions using various parameters form the test parameter sets. The test tracks are rewritten using the same parameters used to write the test tracks at 204 of process 200.

Embodiments of the present disclosure include iteratively writing and erasing the test tracks a predetermined number of times, which may be between two and five, or more times. In an embodiment, the test parameters of the test parameter sets, during various iterations, are substantially same. However, in another embodiment, the test parameters of the test parameter sets are varied during various iterations. At 210, an iteration counter is incremented. If the number of iterations has not reached the predetermined number—at 212 of process 200—then another iteration of erasing and writing is performed.

At 214, once the number of iterations reaches the predetermined number, embodiments determine the performance characteristics of the test tracks. To do so, the optical drive reads the test tracks and determines various aspects of the resulting signals. In various embodiments, jitter, block error rate, signal asymmetry, and/or other aspects of the signal are determined. In various embodiments, determining the performance characteristics includes calculating a composite score (such as a penalty function value) based on two or more performance characteristics of the test tracks.

Embodiments determine, at 216, whether one or more of the performance characteristics—or a composite score based on two or more of the performance characteristics—meet a predetermined threshold. For example, the performance characteristics could be calculated from a penalty function, and the predetermined threshold could be a predetermined maximum penalty function value. In that case, the determination that the performance characteristics meet the predetermined threshold is based on a determination that the penalty function for at least one test track is less than or equal to the predetermined maximum penalty function value.

At 218, if the performance characteristics of none of the test tracks meet the predetermined threshold, a run counter is incremented. At 220, process 200 determines whether a run counter limit is exceeded. The run counter ensures that the process of iteratively writing and erasing test tracks does not go on indefinitely. At 222, if the run counter limit is exceeded, then the best-performing of the various test parameter sets is selected for use in writing and erasing user data to and from the optical disc. Even in a worst-case scenario, where no test track ever meets the quality threshold, the resulting parameter set is likely to be better than if no calibration were ever performed.

At 224, when at least one test track has performance characteristics that meet predetermined threshold, the corresponding test parameter set of the best-performing test track is selected for use in writing and erasing user data to and from the optical disc.

At 226, once the parameter set is selected, the optical drive verifies that the correlation between the performance characteristics of the best-performing test track and the parameters of the selected parameter set are acceptable, using any number of available mathematical methods. This ensures, for example, that the performance characteristics are not unacceptably correlated with other factors such as laser temperature or time as discussed above. If the correlation is not acceptable, process 200 proceeds to increment the run counter, at 218, and further testing is performed. Otherwise, at 228, if the correlation is acceptable, process 200 uses the selected overwrite parameters to write (and in embodiments erase and overwrite) an additional test track (i.e., a confirmation track). At 230, this additional test track is used to determine that the quality of the selected overwrite parameter set is acceptable. If the quality of the additional test track is not acceptable, then the run counter is incremented at 218 and additional parameter sets are selected and further test tracks are written. If the quality of the additional test track is acceptable, process 200 ends and the selected overwrite parameter set is usable to write and erase user data from the optical disc. In an embodiment, the operations at 228 and 230 are bypassed in the process 200. For example, if the correlation is acceptable at 226, process 200 ends and the calculated overwrite parameter set is usable to write and erase user data from the optical disc.

Figure 3:
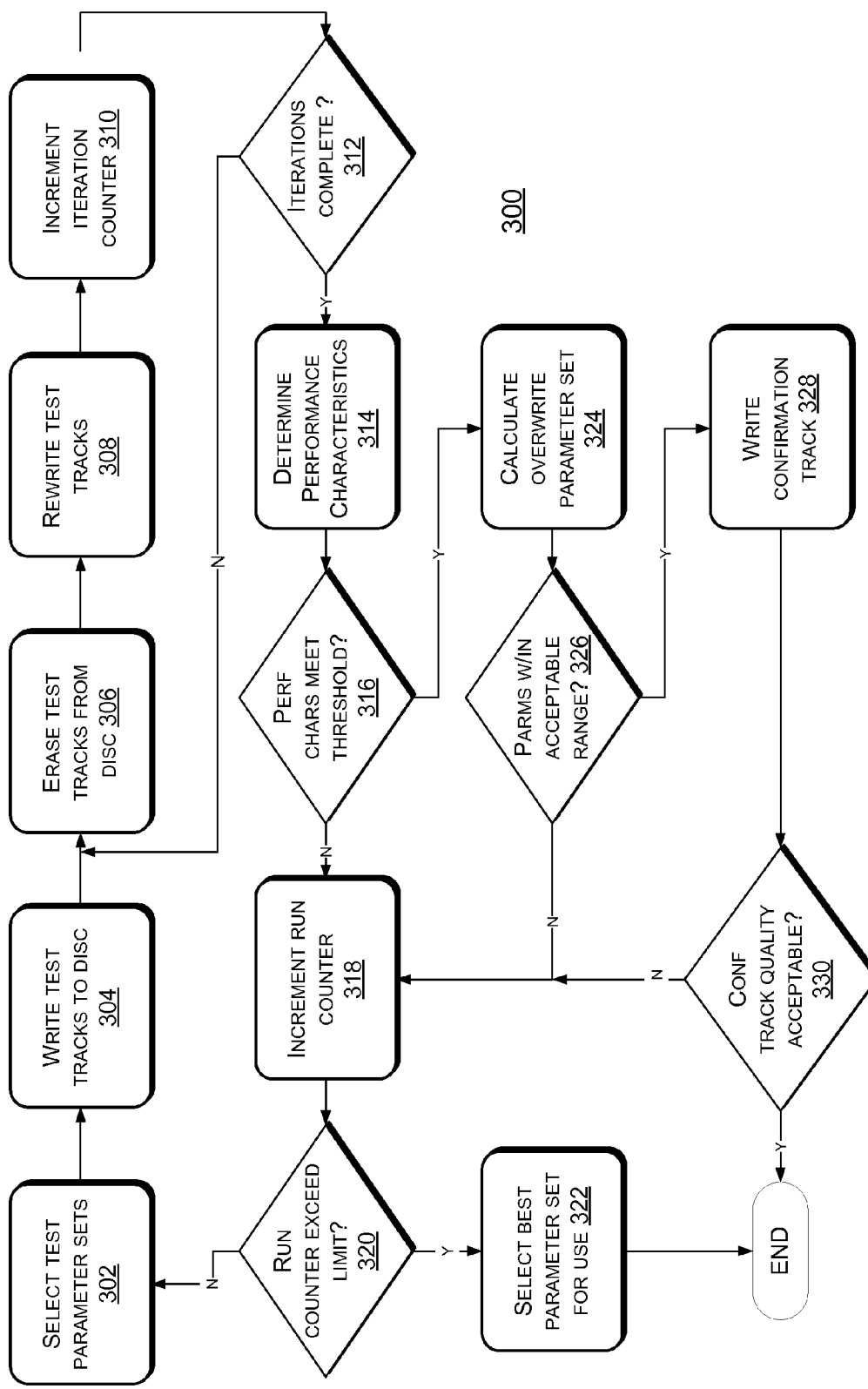
FIG. 3 is a flowchart showing an example of a process for calculating overwrite parameters from a plurality of test parameter sets based on overwrite performance characteristics.

FIG. 3 is a flowchart illustrating an example of a process 300 for calculating overwrite parameters from a plurality of test parameter sets based on overwrite performance characteristics. The methods of FIG. 3 may be implemented by computer-executable instructions. Generally, computer-executable instructions can include routines, programs, objects, components, data structures, procedures, modules, functions, and the like that perform particular functions or that implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods according to various embodiments of the present disclosure. Additionally, individual blocks may be omitted from the method without departing from the spirit and scope of the subject matter described herein. In the context of software, the blocks represent one or more computer instructions that, when executed by one or more processors, perform the recited operations.

Referring to FIGS. 2 and 3, one or more operations of the process 300 of FIG. 3 are at least part similar to those of the process 200 of FIG. 2. For example, operations at 302-322 of the process 300 of FIG. 3 are at least in part similar to corresponding operations at 202-222 of the process 200 of FIG. 2. Accordingly, a detailed description of the operations at 302-322 of the process 300 of FIG. 3 is not provided herein.

Referring again to FIG. 3, when at least one test track has performance characteristics that meet a predetermined threshold at 316, embodiments calculate, at 324, an overwrite parameter set for use in writing and erasing user data to and from the optical disc. For example, the firmware uses numerical regression or another mathematical approximation to calculate an estimate of overwrite parameters that produce values that minimize a penalty function. Thus, rather than selecting the best-performing parameter set for use in writing and erasing user data as in process 200 of FIG. 2, process 300 mathematically approximates overwrite parameters by minimizing the penalty function. This can be accomplished by several mathematical methods including, for example, interpolation, the method of least squares, and so forth.

The performance characteristics influence the outcome of the approximation. For example, in various embodiments the firmware calculates a penalty function to minimize jitter, to minimize BLER, or to minimize a combination of these or other performance characteristics. Thus, minimizing jitter may produce different parameter set values than would minimizing BLER, and so forth.

At 326, process 300 includes determining whether the overwrite parameters calculated at 324 are within the allowable range of writing parameters for the optical disc. Put another way, the optical drive verifies that the calculated overwrite parameters are usable on the optical disc. For example, it is possible that the optical drive will calculate a write power level of 20 mWatts when minimizing the penalty function, whereas the optical disc might be capable of handling up to 15 mWatts (as indicated, for example, by the disc's ADIP formation). If one or more of the calculated values of the overwrite parameter set fall outside of the capabilities of the optical disc, process 300 proceeds too increment the run counter at 318, and further testing is performed if the run counter has not reached the run limit.

If the calculated parameters fall within the allowable ranges, process 300 includes, at 328, using the calculated overwrite parameters to overwrite an additional test track (i.e., a confirmation track). This additional test track is used, at 330, to determine that the quality of the calculated overwrite parameter set is acceptable. If the quality of the additional test track is not acceptable, then the run counter is incremented at 318 and additional parameter sets are selected and further test tracks are written. If the quality of the additional test track is acceptable, process 300 ends and the calculated overwrite parameter set is usable to write and erase user data from the optical disc. In an embodiment, the operations at 328 and 330 are bypassed in the process 300. For example, if the calculated parameters fall within the allowable ranges at 326, process 300 ends and the calculated overwrite parameter set is usable to write and erase user data from the optical disc.

Examples of Optical Drives

Figure 4:
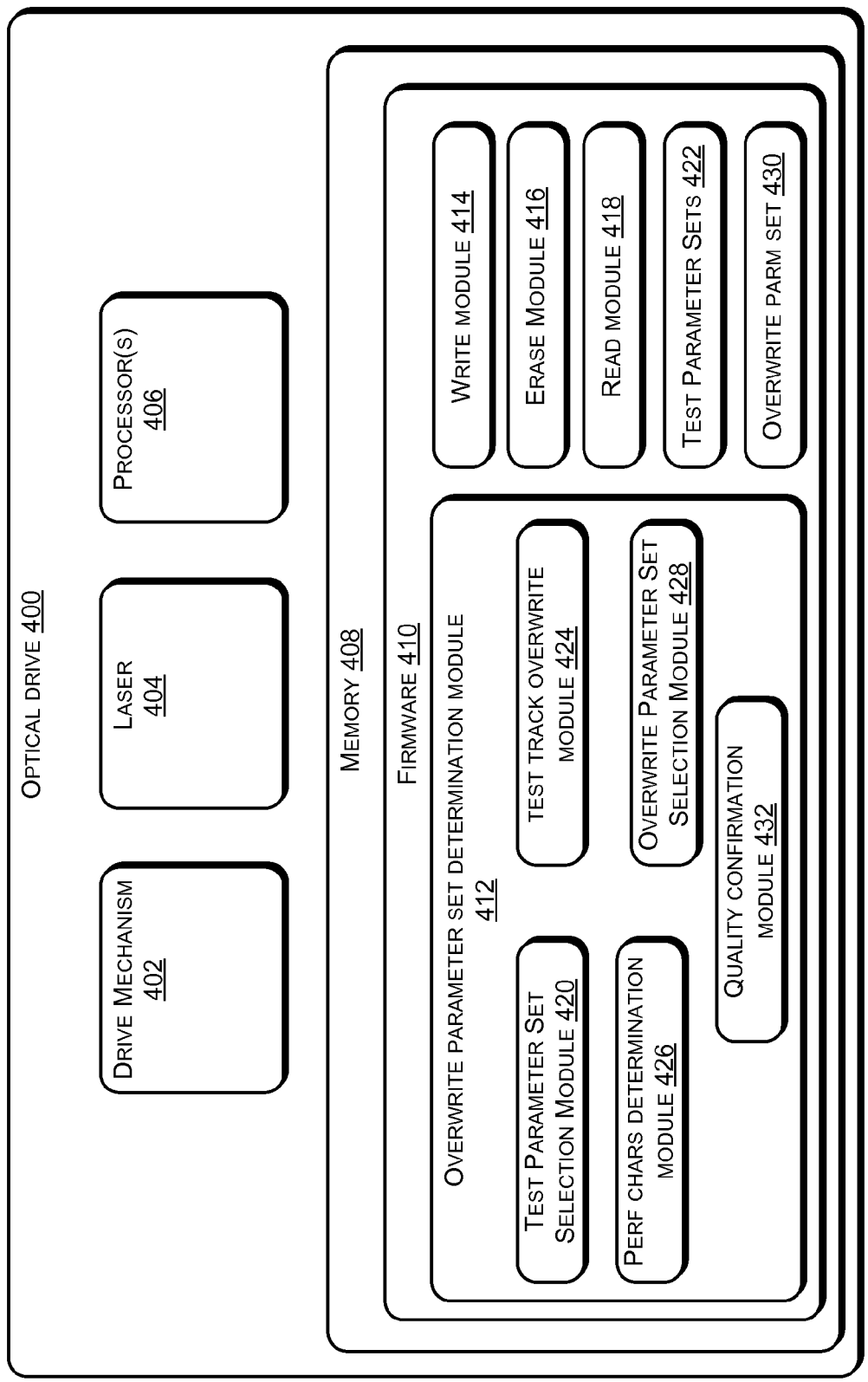
FIG. 4 is an example of an optical drive including one or more processors and firmware stored in a memory.

FIG. 4 illustrates an example of an optical drive including one or more processors and firmware stored in a memory. Optical drive 400 includes drive mechanism 402, laser 404, one or more processors 406, and memory 408.

Memory 408 stores program instructions that are loadable and executable on processor(s) 406, as well as data generated during execution of and/or usable in conjunction with, these programs. In the illustrated example, memory 408 stores firmware 410, which includes overwrite parameter set determination module 412, write module 414, erase module 416, and read module 418. Write module 414 is configured to control laser 404 and drive mechanism 402 to write test data and user data to an optical disc. Erase module 416 is configured to control laser 404 and drive mechanism 402 to erase test data and user data from optical disc. Read module 418 is configured to control laser 404 and drive mechanism 402 to read test data and user data from the optical disc.

Overwrite parameter set determination module 412 includes test parameter set selection module 420, which is configured to select a plurality of test parameter sets 422 for iteratively writing and erasing test data. Test parameter set selection module 420 selects test parameter sets 422 so that they have combinations of allowable values for use in a general or specific rewriteable disc. For example, ADIP information included on a disc inserted into optical drive 400 may include acceptable ranges for various parameters. If so, test parameter set selection module 420 uses the ADIP information to construct the test parameter sets 422. Alternatively, test parameter set selection module 420 uses preprogrammed ranges of allowable values to construct the plurality of test parameter sorts 422. In still further embodiments, test parameter set selection module 420 uses test parameter sets 422 that have been preprogrammed onto memory 408. The test parameter sets 422 include, among other things, various erase power levels. The values of the various test parameter sets 422 are randomly varied, as discussed elsewhere within this Detailed Description to minimize the probability that the performance characteristics of test tracks written to the optical disc will be unacceptably correlated with factors other than test parameter sets 422.

Test track overwrite module 424 is configured to iteratively write test data to test tracks or other portions to the optical disc using corresponding ones of the selected test parameter sets 422. For example, the test track overwrite module 424 is configured to control the laser mechanism and the drive mechanism 402 to iteratively write test data to a plurality of portions of the optical disc based on a plurality of corresponding test parameter sets. Test track overwrite module 424 is also configured to control the laser mechanism and the drive mechanism 402 to overwrite for a certain number of iterations, such as between two and five iterations. As noted elsewhere within this Detailed Description, after two or three overwrites, the overwrite characteristics of most optical discs will not vary significantly with additional overwrite iterations. Thus, the performance characteristics of most optical discs can be reasonably determined after two or three iterations, although embodiments of test track overwrite module 424 write and erase the test tracks up to five or more times.

Performance characteristics determination module 426 is configured to determine performance characteristics of the test tracks after the test tracks have been erased and written a certain number of times. Performance characteristics determination module 426 is configured to cause read module 418 to read the test data from the test tracks. Performance characteristics determination module 426 is also configured to determine the performance characteristics of the tracks from analysis of the signals that result from reading the test tracks. In various embodiments, jitter, block error rate, signal asymmetry, and/or other aspects of the signals are determined. In various embodiments, determining the performance characteristics includes calculating a composite score (such as a penalty function value) based on two or more performance characteristics of the test tracks.

Overwrite parameter set selection module 428 is configured to determine whether at least one of the test tracks meet a threshold performance level, such as for example a maximum penalty function value. Overwrite parameter set selection module 428 is configured to determine, upon a determination that at least one test track meets the threshold performance level, an overwrite parameter set 430 for use to write and erase user data to the optical disc. The overwrite parameter set 430 is determined from the performance characteristics of the test tracks. For example, the test track with the best performance characteristics is in embodiments, selected to be overwrite parameter set 430.

In alternative embodiments, overwrite parameter set 430 is calculated from the parameters of the best-performing test parameter set. For example, embodiments of overwrite parameter set selection module 428 use numerical regressions or other mathematical approximations to estimate overwrite parameters that minimize a penalty function. This can be accomplished by several mathematical methods including, for example, interpolation, the method of least squares, and so forth. Overwrite parameter set selection module 428 is configured to determine that the calculated overwrite parameter values are within acceptable ranges for the optical disc, such as determined for example from ADIP information contained in the disc, or from other information.

Quality confirmation module 432 is configured to cause write module 414 and erase module 416 to write and erase test data to an additional test track to ensure the performance of the selected or calculated overwrite parameter set 430. If the quality of the additional test track meets a minimum threshold for quality, overwrite parameter set 430 is usable to write and erase user data to the optical disc. Thus, write module 414 is configured to write user data to the optical disc using overwrite parameter set 430, and erase module 416 is configured to erase user data from the optical disc using overwrite parameter set 430.

In various embodiments, depending on the configuration and type of computing device used, memory 408 may include volatile memory (such as random access memory (RAM)) and/or non-volatile memory (such as read-only memory (ROM), flash memory, etc.). Memory 108 may also include additional removable storage and/or non-removable storage including, but not limited to, flash memory, magnetic storage, optical storage, and/or tape storage that may provide non-volatile storage of computer readable instructions, data structures, program modules, and other data.

Memory 408 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Figure 5:
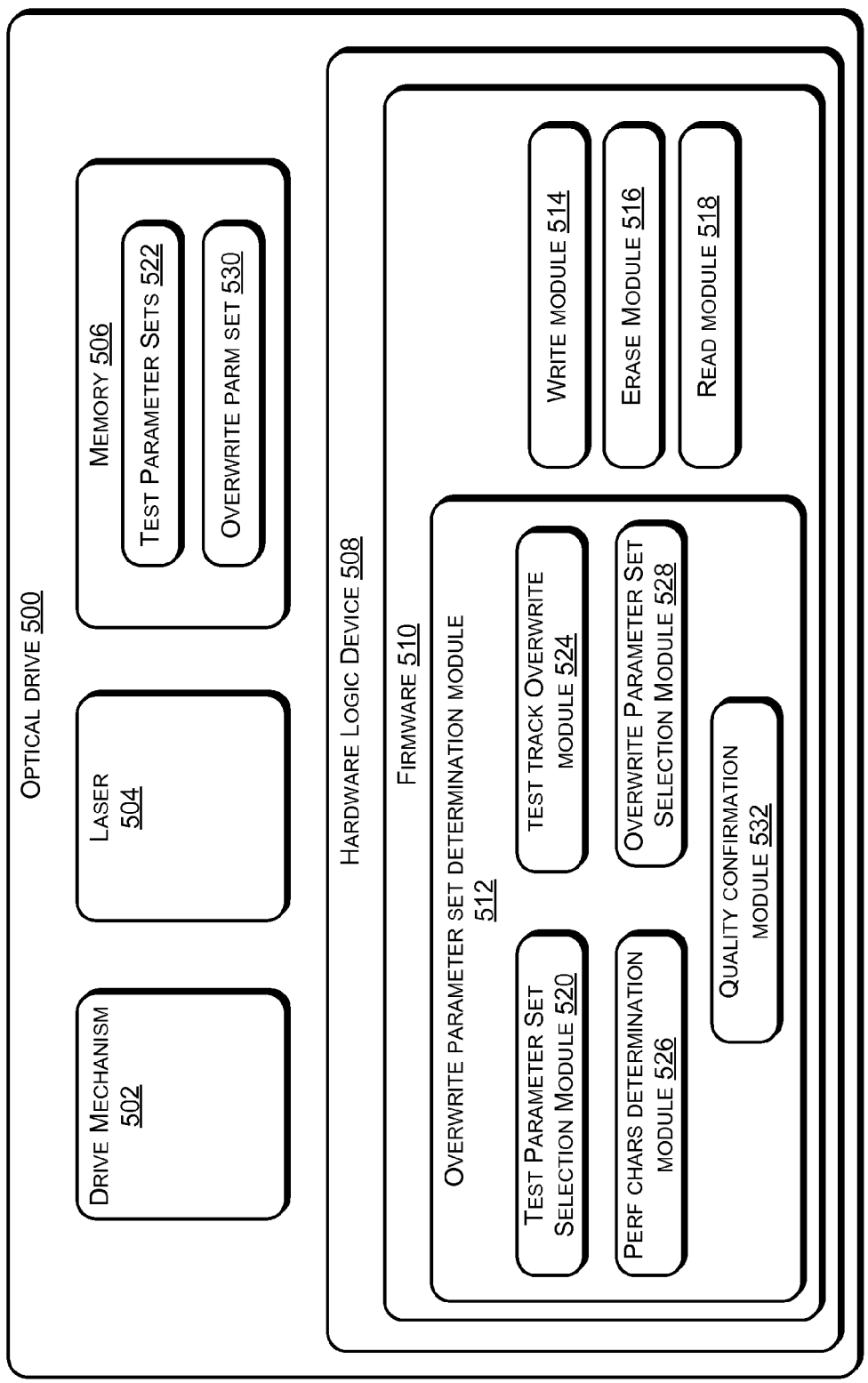
FIG. 5 is an example of an optical drive including firmware embodied in a hardware logic device.

FIG. 5 illustrates an example of an optical drive 500 including firmware embodied in a hardware logic device. One or more components of the optical drive 500 of FIG. 5 is at least in part similar to corresponding components of the optical drive 400 of FIG. 4. Optical drive 500 includes drive mechanism 502 and laser 504, which are, at least in part similar to the corresponding components of the optical drive 400 of FIG. 4. The optical drive 500 also includes memory 506, and hardware logic device 508. Hardware logic device 508 is, in various embodiments, an application specific integrated circuit (ASIC), a field programmable gate array, hybrid circuit device, or other device. Hardware logic device 508 includes firmware 510.

Firmware 510 includes overwrite parameter set determination module 512, write module 514, erase module 516, and read module 518, which are at least in part similar to the corresponding components of the optical drive 400 of FIG. 4. Accordingly, a detailed description of the overwrite parameter set determination module 512, write module 514, erase module 516, and read module 518 are omitted herein.

Overwrite parameter set determination module 512 includes a test parameter set selection module 520, test track overwrite module 524, performance characteristics determination module 526, overwrite parameter set selection module 528, and quality confirmation module 532, which are at least in part similar to the corresponding components of the optical drive 400 of FIG. 4. Accordingly, a detailed description of the test parameter set selection module 520, test track overwrite module 524, performance characteristics determination module 526, overwrite parameter set selection module 528, and quality confirmation module 532 are omitted herein. In various embodiments, the test parameter set selection module 520 is configured to select a plurality of test parameter sets 522 (e.g., similar to the test parameter sets 122), which is stored in the memory 506. In various embodiments, the overwrite parameter set selection module 528 is configured to determine an overwrite parameter set 530 (similar to the overwrite parameter set 430), which is stored in the memory 506.

Firmware 410 of optical drive 400 of FIG. 4 is stored on memory 108 and includes a plurality of programming instructions executable by processor(s) 406. Firmware 510 of optical drive 500 of FIG. 5 is integrated within hardware logic device 508, and is implemented as a series of logic circuits. But firmware according to various embodiments include alternative approaches, with some aspects of the firmware residing as logic within a hardware device and other aspects implemented as software instructions executable by a processor. The embodiments of the present disclosure are not intended to be limited to only those embodiments shown in FIGS. 4 and 5.

CONCLUSION

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Operations of processes 200 and 300 can be suitably combined and may comport with techniques and/or configurations described in connection with FIGS. 1 and 4-5 in various embodiments.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method, comprising:
   iteratively writing a plurality of test portions to a storage medium using a corresponding plurality of test parameter sets;
   iteratively erasing the plurality of test portions from the storage medium using corresponding erase power levels included within the corresponding plurality of test parameter sets; and
   determining an overwrite parameter set for writing user data to the storage medium, the determining based on write performance characteristics of the plurality of test portions after the plurality of test portions have been iteratively erased and rewritten for a predetermined number of iterations.

2. The method of claim 1, wherein the determining includes selecting the overwrite parameter set to be one of the plurality of test parameter sets that corresponds to a best-performing one of the test portions.

3. The method of claim 1, wherein the determining includes estimating the overwrite parameter set based on overwrite performance characteristics of the plurality of test portions.

4. The method of claim 1, wherein the overwrite performance characteristics include one or more of jitter, block error rate, asymmetry of signals, Beta, and run lengths of pulses.

5. The method of claim 1, further comprising calculating a plurality of penalty values based on the overwrite performance characteristics that correspond to the plurality of test portions.

6. The method of claim 5, further comprising iteratively writing and iteratively erasing another plurality of test portions to the storage medium using a plurality of other corresponding test parameter sets upon a determination that a certain number of penalty values of the plurality of penalty values exceed a maximum penalty function value.

7. The method of claim 1, wherein the predetermined number of iterations is equal to two or three iterations.

8. The method of claim 1, wherein the storage medium is an optical disc.

9. An apparatus, comprising:
one or more processors configured to implement logic modules, the logic modules including:
a test portion overwrite module configured to iteratively write and erase test data to a plurality of portions of a storage medium based on a plurality of corresponding test parameter sets, wherein the plurality of corresponding test parameter sets include corresponding write power levels and corresponding erase power levels; and
an overwrite parameter set selection module configured to determine, based on overwrite performance characteristics of the plurality of portions, an overwrite parameter set including a write power and an erase power for use in writing and erasing user data to the storage medium, wherein the overwrite parameter set is determined after the plurality of portions have been overwritten a certain number of times.

10. The apparatus of claim 9, wherein the overwrite parameter set selection module is further configured to select one of the plurality of test parameter sets to be the overwrite parameter set based on a comparison of the overwrite performance characteristics of the plurality of portions.

11. The apparatus of claim 9, wherein the overwrite parameter set selection module is further configured to calculate the overwrite parameter set based on the plurality of test parameter sets and the overwrite performance characteristics of the corresponding test portions.

12. The apparatus of claim 9, wherein the plurality of performance characteristics include jitter levels of the plurality of portions.

13. The apparatus of claim 9, wherein
the logic modules further include a performance characteristics determination module configured to calculate a plurality of composite scores for the plurality of test portions utilizing two or more performance characteristics of the plurality of test portions, and
the overwrite parameter set selection module is further configured to determine the overwrite parameter set based on the plurality of composite scores.

14. The apparatus of claim 9, wherein
the one or more processors includes an application specific integrated circuit (ASIC), and
one or more of the logic modules reside in portions of the ASIC.

15. The apparatus of claim 9, wherein the test portion overwrite module is further configured to control a laser and a drive mechanism to iteratively write and erase test data to the plurality of portions based on another plurality of corresponding test parameter sets upon a determination that none of the plurality of portions has overwrite performance characteristics that meet a threshold performance level.

16. The apparatus of claim 9, further comprising:
a write module configured to cause a laser and drive mechanism to write user data to the storage medium using one or more parameters of the overwrite parameter set; and
an erase module configured to cause the laser and drive mechanism to erase user data from the optical disc using at least an erase power level of the overwrite parameter set.

17. The apparatus of claim 9, wherein the test portion overwrite module is further configured to control a laser and drive mechanism of the storage medium to iteratively write and erase test the data.

18. The apparatus of claim 9, wherein the storage medium is an optical disc.

19. An optical drive, comprising:
a laser; and
firmware configured to cause the laser to alternatingly write and erase test data to a plurality of test portions of an optical disc a predetermined number of times utilizing a plurality of corresponding test parameter sets, and determine an overwrite parameter set for use in writing and erasing user data to the optical disc based on overwrite performance characteristics of the plurality of test portions.

20. The optical drive of claim 19, wherein the firmware is further configured to select the overwrite parameter set from a best-performing one of the plurality of corresponding test parameter sets.

21. The optical drive of claim 19, wherein the firmware is further configured to calculate the overwrite parameter set from one or more of the plurality of corresponding test parameter sets based on the overwrite performance characteristics.

* * * * *